United States Patent
Pore et al.

(10) Patent No.: US 12,443,507 B2
(45) Date of Patent: Oct. 14, 2025

(54) SYSTEM AND METHOD FOR TRACING DATA STREAMED ACROSS DIFFERENT PLATFORMS AND IDENTIFYING DATA MANIPULATIONS PERFORMED ACROSS DIFFERENT PLATFORMS

(71) Applicant: JPMorgan Chase Bank, N.A., New York, NY (US)

(72) Inventors: Akshay Pore, Phoenix, AZ (US); Piyoosh Bhargav, Phoenix, AZ (US); Anthony Mavromatis, Brooklyn, NY (US); Andrew Jennings, New York, NY (US); Matthew Rawlings, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 69 days.

(21) Appl. No.: 18/584,687

(22) Filed: Feb. 22, 2024

(65) Prior Publication Data

US 2025/0272213 A1    Aug. 28, 2025

(51) Int. Cl.
*G06F 11/34* (2006.01)
*G06F 11/30* (2006.01)
*G06F 11/32* (2006.01)

(52) U.S. Cl.
CPC ...... *G06F 11/3476* (2013.01); *G06F 11/3006* (2013.01); *G06F 11/323* (2013.01)

(58) Field of Classification Search
CPC . G06F 11/323; G06F 11/3476; G06F 11/3006
USPC ................................................ 714/45, 37
See application file for complete search history.

(56) References Cited

U.S. PATENT DOCUMENTS

| | | | |
|---|---|---|---|
| 2022/0237185 A1* | 7/2022 | Portisch | G06F 16/2465 |
| 2023/0108560 A1* | 4/2023 | Wang | G06F 3/04817 |
| | | | 717/109 |
| 2023/0116631 A1* | 4/2023 | Le Bouthillier | G06F 21/6209 |
| | | | 726/26 |
| 2024/0289310 A1* | 8/2024 | Ooi | G06F 11/3419 |

FOREIGN PATENT DOCUMENTS

| | | | | |
|---|---|---|---|---|
| EP | 2674878 A1 * | 12/2013 | | G06F 16/2358 |
| EP | 3776257 B1 * | 12/2022 | | G06F 21/6227 |

\* cited by examiner

*Primary Examiner* — Chae M Ko
(74) *Attorney, Agent, or Firm* — GREENBLUM & BERNSTEIN, P.L.C.

(57) ABSTRACT

A method and system for tracing data streamed across differing different system platforms are disclosed. The method includes providing and storing context data corresponding to a data event published to a streaming service, extracting a data classifier block from the stored context data, and extracting a lineage tracer block from the stored context data. The method further includes converting the lineage tracer block into a linked lineage triple, and generating a lineage graph using the linked lineage triple for visualization.

20 Claims, 14 Drawing Sheets

FIG. 10

```
"privacyClassifiers": [
    "privacyClassifiers": {
        "CODE1": [
            "customerID"
        ]
    }
]

"dataClassifier": [
    "governanceGroups": {
        "governanceGroupsCodes": {
            "CODE1": [
                "customerName"
            ],
            "CODE2": [
                "streetAddress",
                "email",
                "telephone"
            ]
        }
    }
]
```

SYSTEM AND METHOD FOR TRACING DATA STREAMED ACROSS DIFFERENT PLATFORMS AND IDENTIFYING DATA MANIPULATIONS PERFORMED ACROSS DIFFERENT PLATFORMS

TECHNICAL FIELD

This disclosure generally relates to tracing data streamed across different platforms and identifying manipulations performed, whether performed in a streaming pipeline or offline. More specifically, the present disclosure generally relates to generating a data lineage based on a data snippet by tracing of data streamed across different platforms using the data snippet and providing a visualization of the generated data lineage.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Data lineage, including tracing and tracking, helps to ensure accuracy and reliability of data. On the other hand, data classification helps ensure that data is protected appropriately based on its sensitivity and critically. However, certain technical challenges exist with conventional data lineage and data classification processes. More specifically, there is no scalable method or solution to identify, classify data and capture provenance and lineage traceability for complex data events and signals that are transmitted across multiple systems using data streaming techniques. Further, conventional solutions available do not support complex offline transformations, which leads to vendor lock-ins, and are dependent on certain products to be used which have scalability limits.

SUMMARY

According to an aspect of the present disclosure, a method for tracing data streamed across differing different system platforms is provided. The method includes providing, by each of a plurality of devices and to a database, context data corresponding to a data event published to a streaming service including a streaming pipeline; storing, in the database, the context data provided by each of the plurality of devices; reading, by a data classifier, the context data stored in the database and extracting a data classifier block from the stored context data; gathering, by the data classifier and from the extracted data classifier block, personal identification information and sensitive data elements; reading, by a lineage processor, the context data stored in the database and extracting a lineage tracer block from the stored context data; converting, by the lineage processor, the lineage tracer block into a linked lineage triple; processing, by the lineage processor, the linked lineage triple by tokenizing and deduplicating the linked lineage triple; and generating, by the data trace builder, a lineage graph using the tokenized and deduplicated linked lineage triple for visualization.

According to another aspect of the present disclosure, the lineage tracer block includes one or more of an origin data object, a transform data object and a destination data object.

According to another aspect of the present disclosure, the origin data object includes information related to an entity being sourced.

According to yet another aspect of the present disclosure, the destination data object includes information related to the data event being published.

According to another aspect of the present disclosure, the transform data object includes one or more transformations that occurred.

According to a further aspect of the present disclosure, at least one of the one or more transformations is performed offline from the streaming pipeline.

According to yet another aspect of the present disclosure, the one or more transformations include a transformation at an entity level or a transformation at a column level.

According to a further aspect of the present disclosure, the plurality of devices includes a data publisher device that is configured as a dedicated data publisher.

According to another aspect of the present disclosure, the plurality of devices includes a data publisher device that is configured to jointly operate as a data publisher and a data consumer.

According to a further aspect of the present disclosure, the plurality of devices includes a data consumer device that is configured as a dedicated data consumer.

According to a further aspect of the present disclosure, the lineage tracer block includes a mode type.

According to a further aspect of the present disclosure, the mode type includes one of a streaming type and a batch type.

According to a further aspect of the present disclosure, the lineage tracer block further includes a mode sub-type.

According to a further aspect of the present disclosure, the sub-mode type includes one of a system of record and derived.

According to a further aspect of the present disclosure, the linked lineage triple includes at least two nodes and an edge that connects the at least two nodes.

According to a further aspect of the present disclosure, the method further includes deriving at least one insight specific to a node by applying a graphic machine learning algorithm on the lineage graph.

According to a further aspect of the present disclosure, the lineage tracer block is a JSON object qualified with prove ontology.

According to a further aspect of the present disclosure, at least one the one or more transformations is determined based on property attributes on nodes present in the lineage graph.

According to an aspect of the present disclosure, a system for tracing data streamed across differing different system platforms is provided. The system includes a memory, a display and a processor. The system is configured to perform: providing, by each of a plurality of devices and to a database, context data corresponding to a data event published to a streaming service including a streaming pipeline; storing, in the database, the context data provided by each of the plurality of devices; reading, by a data classifier, the context data stored in the database and extracting a data classifier block from the stored context data; gathering, by the data classifier and from the extracted data classifier block, personal identification information and sensitive data elements; reading, by a lineage processor, the context data stored in the database and extracting a lineage tracer block from the stored context data; converting, by the lineage processor, the lineage tracer block into a linked lineage triple; processing, by the lineage processor, the linked lin-eage triple by tokenizing and deduplicating the linked lineage triple; and generating, by the data trace builder, a lineage graph using the tokenized and deduplicated linked lineage triple for visualization.

According to another aspect of the present disclosure, a non-transitory computer readable storage medium that stores a computer program for tracing data streamed across differing different system platforms is provided. The computer program, when executed by a processor, causes a system to perform multiple processes including: providing, by each of a plurality of devices and to a database, context data corresponding to a data event published to a streaming service including a streaming pipeline; storing, in the database, the context data provided by each of the plurality of devices; reading, by a data classifier, the context data stored in the database and extracting a data classifier block from the stored context data; gathering, by the data classifier and from the extracted data classifier block, personal identification information and sensitive data elements; reading, by a lineage processor, the context data stored in the database and extracting a lineage tracer block from the stored context data; converting, by the lineage processor, the lineage tracer block into a linked lineage triple; processing, by the lineage processor, the linked lineage triple by tokenizing and deduplicating the linked lineage triple; and generating, by the data trace builder, a lineage graph using the tokenized and deduplicated linked lineage triple for visualization.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 10 illustrates a Governance Classifier Block in accordance with an exemplary embodiment.

DETAILED DESCRIPTION

Figure 1:
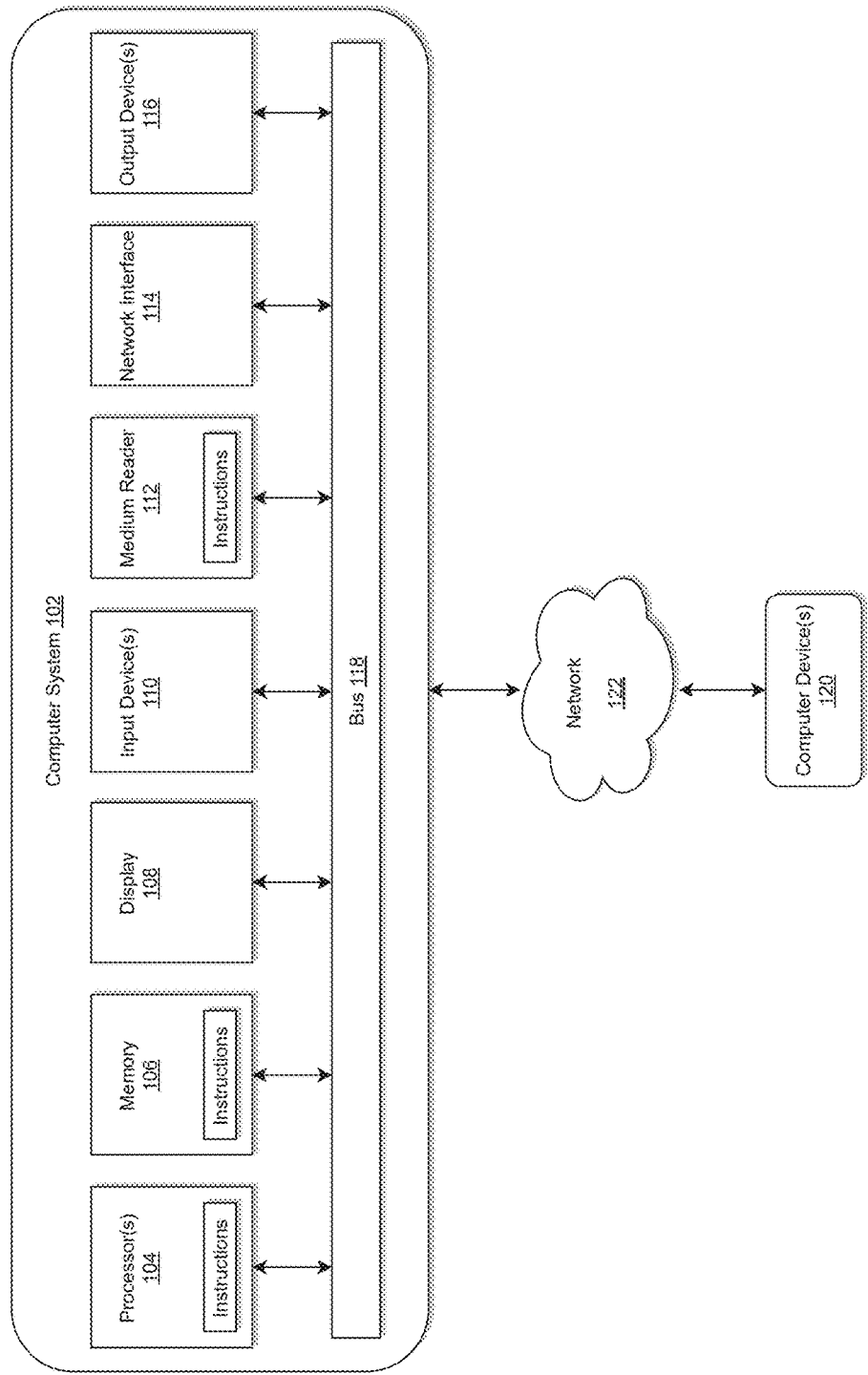
FIG. 1 illustrates a computer system for implementing a streaming data identification, classification and tracing (SDICT) system for tracking offline transformations in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a streaming data identification, classification and tracing (SDICT) system for tracking offline transformations in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, or the like.

The computer system 102 may be in communication with one or more additional computer devices 120 via a network 122. The network 122 may be, but is not limited thereto, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
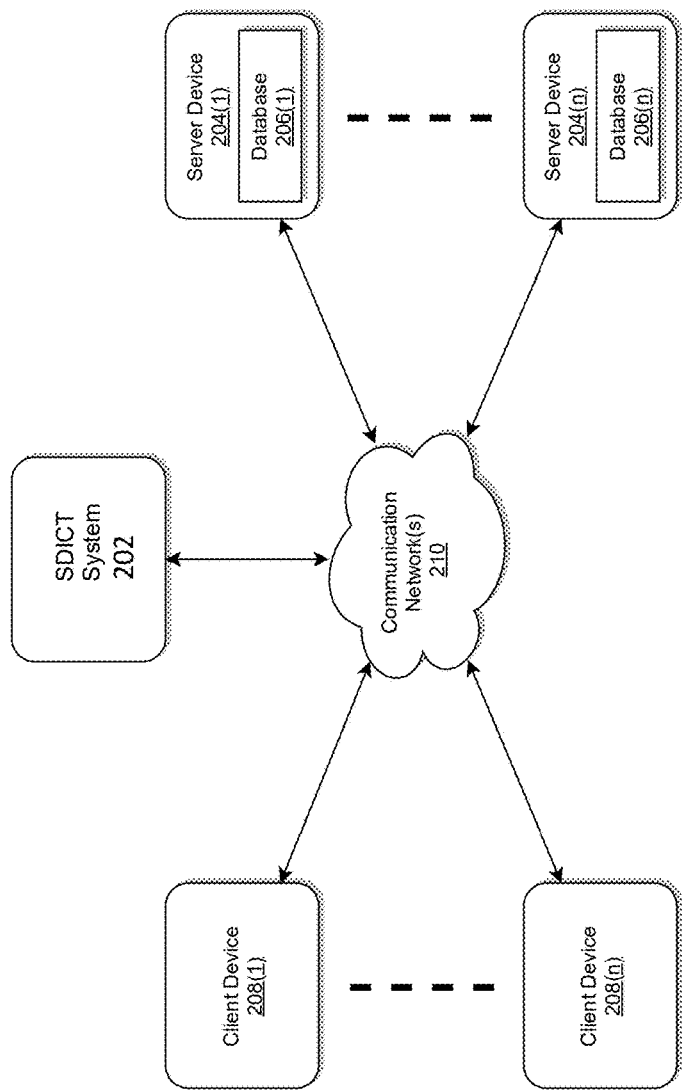
FIG. 2 illustrates an exemplary diagram of a network environment with a SDICT system for tracking offline transformations in accordance with an exemplary embodiment.

FIG. 2 illustrates an exemplary diagram of a network environment with a SDICT system for tracking offline transformations in accordance with an exemplary embodiment.

A SDICT system 202 may be implemented with one or more computer systems similar to the computer system 102 as described with respect to FIG. 1.

The SDICT system 202 may store one or more applications that can include executable instructions that, when executed by the SDICT system 202, cause the SDICT system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the SDICT system 202 itself, may be located in virtual server(s) running in a cloud-based computing environment rather than being tied to one or more specific physical network computing devices. Also, the application(s) may be running in one or more virtual machines (VMs) executing on the SDICT system 202. Additionally, in one or more embodiments of this technology, virtual machine(s) running on the SDICT system 202 may be managed or supervised by a hypervisor.

In the network environment 200 of FIG. 2, the SDICT system 202 is coupled to a plurality of server devices 204(1)-204 (n) that hosts a plurality of databases 206(1)-206 (n), and also to a plurality of client devices 208(1)-208 (n) via communication network(s) 210. According to exemplary aspects, databases 206(1)-206 (n) may be configured to store data that relates to distributed ledgers, blockchains, user account identifiers, biller account identifiers, and payment provider identifiers. A communication interface of the SDICT system 202, such as the network interface 114 of the computer system 102 of FIG. 1, operatively couples and communicates between the SDICT system 202, the server devices 204(1)-204 (n), and/or the client devices 208(1)-208 (n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SDICT system 202, the server devices 204(1)-204 (n), and/or the client devices 208(1)-208 (n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SDICT system 202 may be a standalone device or integrated with one or more other devices or apparatuses, such as one or more of the server devices 204(1)-204 (n), for example. In one particular example, the SDICT system 202 may be hosted by one of the server devices 204(1)-204 (n), and other arrangements are also possible. Moreover, one or more of the devices of the SDICT system 202 may be in the same or a different communication network including one or more public, private, or cloud networks, for example.

The plurality of server devices 204(1)-204 (n) may be the same or similar to the computer system 102 or the computer device 120 as described with respect to FIG. 1, including any features or combination of features described with respect thereto. For example, any of the server devices 204(1)-204 (*n*) may include, among other features, one or more processors, a memory, and a communication interface, which are coupled together by a bus or other communication link, although other numbers and/or types of network devices may be used. The server devices 204(1)-204 (*n*) in this example may process requests received from the SDICT system 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204 (*n*) may be hardware or software or may represent a system with multiple servers in a pool, which may include internal or external networks. The server devices 204(1)-204 (*n*) hosts the databases 206(1)-206 (*n*) that are configured to store metadata sets, data quality rules, and newly generated data.

Although the server devices 204(1)-204 (*n*) are illustrated as single devices, one or more actions of each of the server devices 204(1)-204 (*n*) may be distributed across one or more distinct network computing devices that together comprise one or more of the server devices 204(1)-204 (*n*). Moreover, the server devices 204(1)-204 (*n*) are not limited to a particular configuration. Thus, the server devices 204(1)-204 (*n*) may contain a plurality of network computing devices that operate using a master/slave approach, whereby one of the network computing devices of the server devices 204(1)-204 (*n*) operates to manage and/or otherwise coordinate operations of the other network computing devices.

The server devices 204(1)-204 (*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208 (*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204 (*n*) or other client devices 208(1)-208 (*n*).

According to exemplary embodiments, the client devices 208(1)-208 (*n*) in this example may include any type of computing device that can facilitate the implementation of the SDICT system 202 that may efficiently provide a platform for implementing a cloud native SDICT system module, but the disclosure is not limited thereto.

The client devices 208(1)-208 (*n*) may run interface applications, such as standard web browsers or standalone client applications, which may provide an interface to communicate with the SDICT system 202 via the communication network(s) 210 in order to communicate user requests. The client devices 208(1)-208 (*n*) may further include, among other features, a display device, such as a display screen or touchscreen, and/or an input device, such as a keyboard, for example.

Although the exemplary network environment 200 with the SDICT system 202, the server devices 204(1)-204 (*n*), the client devices 208(1)-208 (*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SDICT system 202, the server devices 204(1)-204 (*n*), or the client devices 208(1)-208 (*n*), for example, may be configured to operate as virtual instances on the same physical machine. For example, one or more of the SDICT system 202, the server devices 204(1)-204 (*n*), or the client devices 208(1)-208 (*n*) may operate on the same physical device rather than as separate devices communicating through communication network(s) 210. Additionally, there may be more or fewer SDICT system 202, server devices 204(1)-204 (*n*), or client devices 208(1)-208 (*n*) than illustrated in FIG. 2. According to exemplary embodiments, the SDICT system 202 may be configured to send code at run-time to remote server devices 204(1)-204 (*n*), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
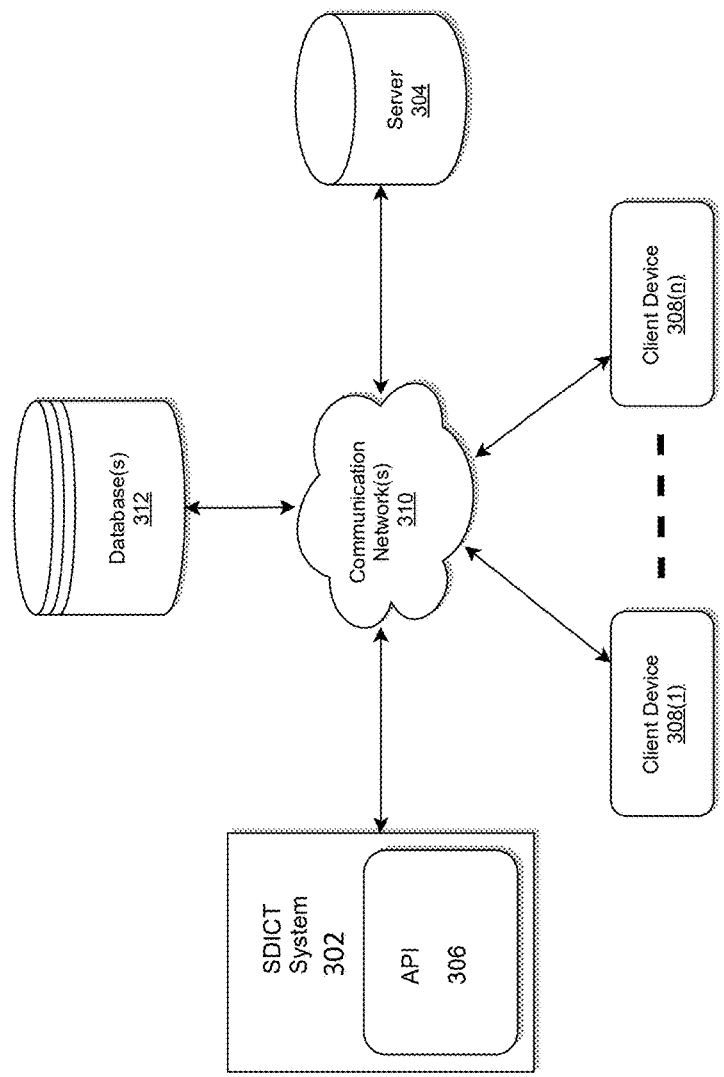
FIG. 3 illustrates a system diagram for implementing a SDICT system for tracking offline transformations in accordance with an exemplary embodiment.

FIG. 3 illustrates a system diagram for implementing a SDICT system for offline reinforcement learning in accordance with an exemplary embodiment.

As illustrated in FIG. 3, the system 300 may include a SDICT system 302 within which a group of API modules 306 is embedded, a server 304, a database(s) 312, a plurality of client devices 308(1) . . . 308(*n*), and a communication network 310.

According to exemplary embodiments, the SDICT system 302 including the API modules 306 may be connected to the server 304, and the database(s) 312 via the communication network 310. Although there is only one database that has been illustrated, the disclosure is not limited thereto. Any number of databases may be utilized. The SDICT system 302 may also be connected to the plurality of client devices 308(1) . . . 308(*n*) via the communication network 310, but the disclosure is not limited thereto.

According to exemplary embodiment, the SDICT system 302 is described and shown in FIG. 3 as including the API modules 306, although it may include other rules, policies, modules, databases, or applications, for example. According to exemplary embodiments, the database(s) 312 may be embedded within the SDICT system 302. According to exemplary embodiments, the database(s) 312 may be configured to store configuration details data corresponding to a desired data to be fetched from one or more data sources, but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a user interface (UI) platform that is configured to enable SDICT system as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the SDICT system 302. In this regard, the plurality of client devices 308(1) . . . 308(n) may be "clients" of the SDICT system 302 and are described herein as such. Nevertheless, it is to be known and understood that the plurality of client devices 308(1) . . . 308(n) need not necessarily be "clients" of the SDICT system 302, or any entity described in association therewith herein. Any additional or alternative relationship may exist between either or both of the plurality of client devices 308(1) . . . 308(n) and the SDICT system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the SDICT system 302 via broadband or cellular communication. Of course, these embodiments are merely exemplary and are not limiting or exhaustive.

The client devices 308(1) . . . 308(n) may be the same or similar to any one of the client devices 208(1)-208 (n) as described with respect to FIG. 2, including any features or combination of features described with respect thereto. The SDICT system 302 may be the same or similar to the SDICT system 202 as described with respect to FIG. 2, including any features or combination of features described with respect thereto.

Figure 4:
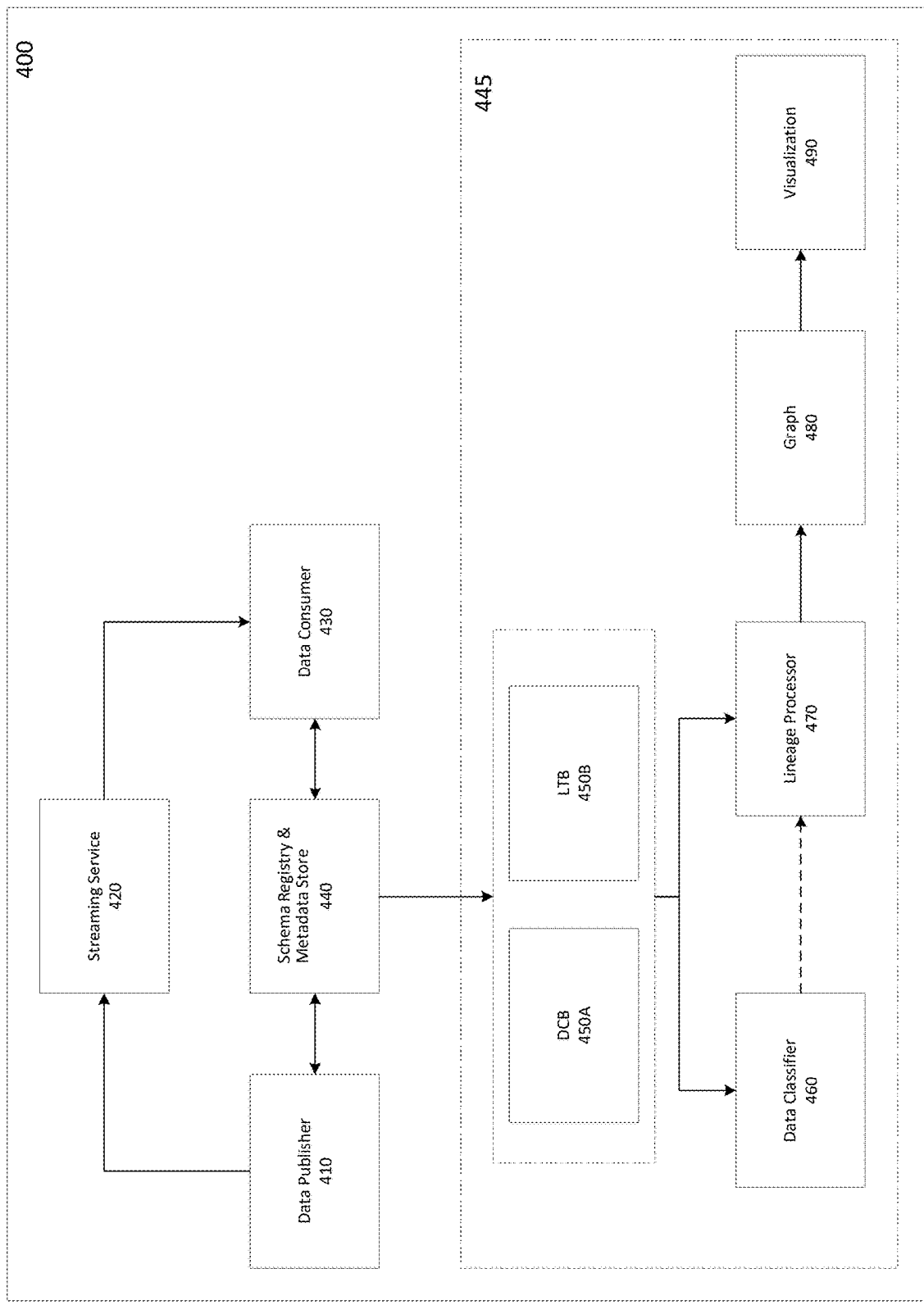
FIG. 4 illustrates a system diagram for generating and providing a visualization of a data lineage based on a data snippet in accordance with an exemplary embodiment.

FIG. 4 illustrates a system diagram for generating and providing a visualization of a data lineage based on a data snippet in accordance with an exemplary embodiment.

According to exemplary aspects, an SDICT system 400 may provide a way to trace data and attribute level lineage throughout a journey of data being streamed across various publishers and consumers. Lineage, governance and privacy information, which may be localized to every publisher and/or consumer, is collected and processed to visualize an end-to-end lineage.

According to exemplary aspects, an SDICT system 400 includes a data publisher 410, a streaming service 420, a data consumer 430, a schema registry and metadata store (SRMS) 440 and a data trace builder 445.

According to exemplary aspects, the data publisher 410 may refer to a system, server or a device responsible for generating and emitting data to a messaging system or an event bus. For example, the data publisher 410 may publish a data event to the streaming service 420. The data event may be an event for Avro schema, which may be a file in JSON format. An Avro record may be a complex data type in Avro, including other fields with their own data types, whether primitive or complex. Although data event in Avro is exemplarily disclosed herein, aspects of the present disclosure are not limited thereto, such that data events in other schemas may be utilized. Further, although the publisher server or device is disclosed herein, aspects of the present disclosure are not limited thereto, such that other systems, servers or devices that are capable of publishing the data event may be utilized. For example, a combined publisher/consumer system, server or device that performs both the operations of the publisher and the consumer may publish the data event.

The data publisher 410 may additionally transmit or publish various data objects and/or blocks to the SRMS 440. The various data objects and/or blocks may include a context object or file, one or more Origin, Transform and Destination (OXD) blocks and one or more governance blocks corresponding to the published data event. Each of the OXD blocks may include at least one of an origin block, a transform block and a destination block. According to exemplary aspects, the one or more OXD blocks may collect associated properties that may be utilized for building lineage. The OXD blocks may provide lineage information, which may be localized to the respective data publisher. According to further aspects, the one or more governance blocks may include one or more data classifier blocks, which may be utilized to identify and classify select data elements, such as critical data elements, sensitive data elements, personal identification information and the like.

The data consumer 430 may refer to a system, server or a device that subscribes to and processes data emitted by the data publisher 410. The streaming service 420 may refer to one or more streaming pipelines that continuously receive modern data as it is published, which allows data to be promptly or in real-time accessible for the data consumer 430. According to exemplary aspects, data transformations may occur within the streaming pipelines, offline or not within the streaming pipelines, or in other platforms. The SRMS 440 may refer to a centralized repository and a database. The centralized repository may manage and store schema for data serialization within an echo system, ensuring consistency and compatibility between data producers and data consumers in distributed systems. The database may store at least one or more of context data/file, lineage data or object, governance data or object and privacy information published by each of the data producer and the data consumer.

According to further aspects, the data trace builder 445 includes a data classifier block (DCB) 450A, a lineage tracer block (LTB) 450B, a data classifier 460, a lineage processor 470, a graph module 480, and a visualization module 490. In an example, the data trace builder 445 may refer to a system that consumes context data or file from the SRMS 440 to extract data classification and lineage information as data blocks and produce linked data triples to build a lineage graph and provide visualization of end-to-end lineage.

According to exemplary aspects, a context is a crucial concept that provides a mapping between terms utilized in a modern data event and corresponding definitions or meanings. Context may permit establishment of a shared understanding of terms, making it possible to represent linked data in a standardized way. Semantic context may exemplarily refer to a JSON object that maps terms to Internationalized Resource Identifiers (IRIs), which allows for different systems to understand and process data consistently.

A context, being a JSON object, may be extended further to add the LTB block 450B (e.g., @lineage) and the DCB block 450A (e.g., @dataClassifer). Context data or file along with lineage and governance information may be stored in the SRMS 440. According to exemplary aspects, the SRMS 440 may be an object store database, which may further process and provide a visualization of lineage. Although the context is described as a JSON object, aspects of the present disclosure are not limited thereto, such that the context may be any data object.

According to exemplary aspects, a structure of a context object stored in the SRMS 440 may be as provided below:
{
  "@context": { },
  "@lineage": { },
  "@dataClassifier": { }
}

According to exemplary aspects, the data trace builder 445 may read or consume context data or file stored in the SRMS 440, extract data classification and lineage information and generate one or more DCBs and LTBs. The DCB 450A may be generated and/or stored by the data trace builder 445, and may be configured to collect select information select information corresponding to the published data event from the SRMS 440. According to exemplary aspects, the data classifier block may be utilized to collect the select information, such as the sensitive information and personal identification information. In an example, sensitive information may include information required by compliance regulations, such as California Consumer Privacy Act (CCPA), General Data Protection Regulation (GDPR) and the like. Further, personal identification information may include information that may be utilized to identify a specific person, such as a social security number, driver license number or the like.

The LTB 450B may be generated and/or stored by the data trace builder 445, and may be configured for aggregating information on the OXD objects from the SRMS 440. According to exemplary aspects, the lineage trace block may be a foundational element for gathering information on data lineage. The lineage trace block may include at least one of an origin object, a transform object and a destination object for collecting associative properties.

The LTB Block 450B may serve as a foundational element for gathering information on data lineage. According to exemplary aspects, the LTB Block 400B may be a JSON object qualified with provisional ontology. Moreover, the LTB Block 450B may be encapsulated under a Lineage Object within Context, and may be used to define associated properties. The Lineage Tracer Block may include Origin, Transform and Destination (OXD) objects, which may collect associated properties that may be utilized for building lineage. In an example, each data publisher or data consumer may publish the OXD blocks to provide lineage information, which may be localized to the respective data publisher or data consumer.

An exemplary LTB design is illustrated as provided below:

```
{
  "@lineage": {
    "modeType": "",
    "modeSubType": "",
    "LineageTracerBlock": {
      "origin": [{ }],
        (P70455 06022332.DOCX 4}
      "transform": { },
      "destination": [{ }]
    }
  }
}
```

The data classifier 460 may refer to a module or processor that parses the DCB block 450A from context to extract select information regulated by government regulations. According to exemplary aspects, select information to be extracted may include sensitive data element (SDE) and personal identification information (PII). Moreover, the data classifier 460 may transmit the select information extracted to the lineage processor 470.

The lineage processor 470 may refer to a module that aggregates and processes lineage tracer blocks to produce a set of linked lineage triples. More specifically, the lineage processor may crawl and parse the lineage tracer blocks to generate linked lineage triples. According to exemplary aspects, the linked lineage tripes may include two nodes connected by an edge.

The lineage processor 470 may further tokenize or encrypt select information received from the data classifier 460. According to exemplary aspects, data classifiers included in the DCB 450A may be utilized to encrypt or tokenize select information, such as the sensitive information and the personal identification information. Further, according to exemplary aspects, when a consumer consumes data published by a producer, a destination object in an OXD block provided by the producer may become an origin object in the OXD block provided by the consumer. As a result, there may be duplication of data when all of the OXD blocks are read together. Accordingly, such duplications may be removed for more efficient processing by the lineage processor.

According to exemplary aspects, the graph module 480 may generate a lineage graph or relationship using the tokenized and deduplicated linked lineage triples. More specifically, the processed lineage triples may be combined together utilizing common nodes. Accordingly, by combining the processed linked lineage triples, an end-to-end lineage graph may be generated.

According to exemplary aspects, the visualization module 490 may provide a visualization or display of the generated graph for further analysis and discovery of hidden properties and relationships that may not have been apparent prior to the generation and/or visualization of the lineage graph.

Figure 5:
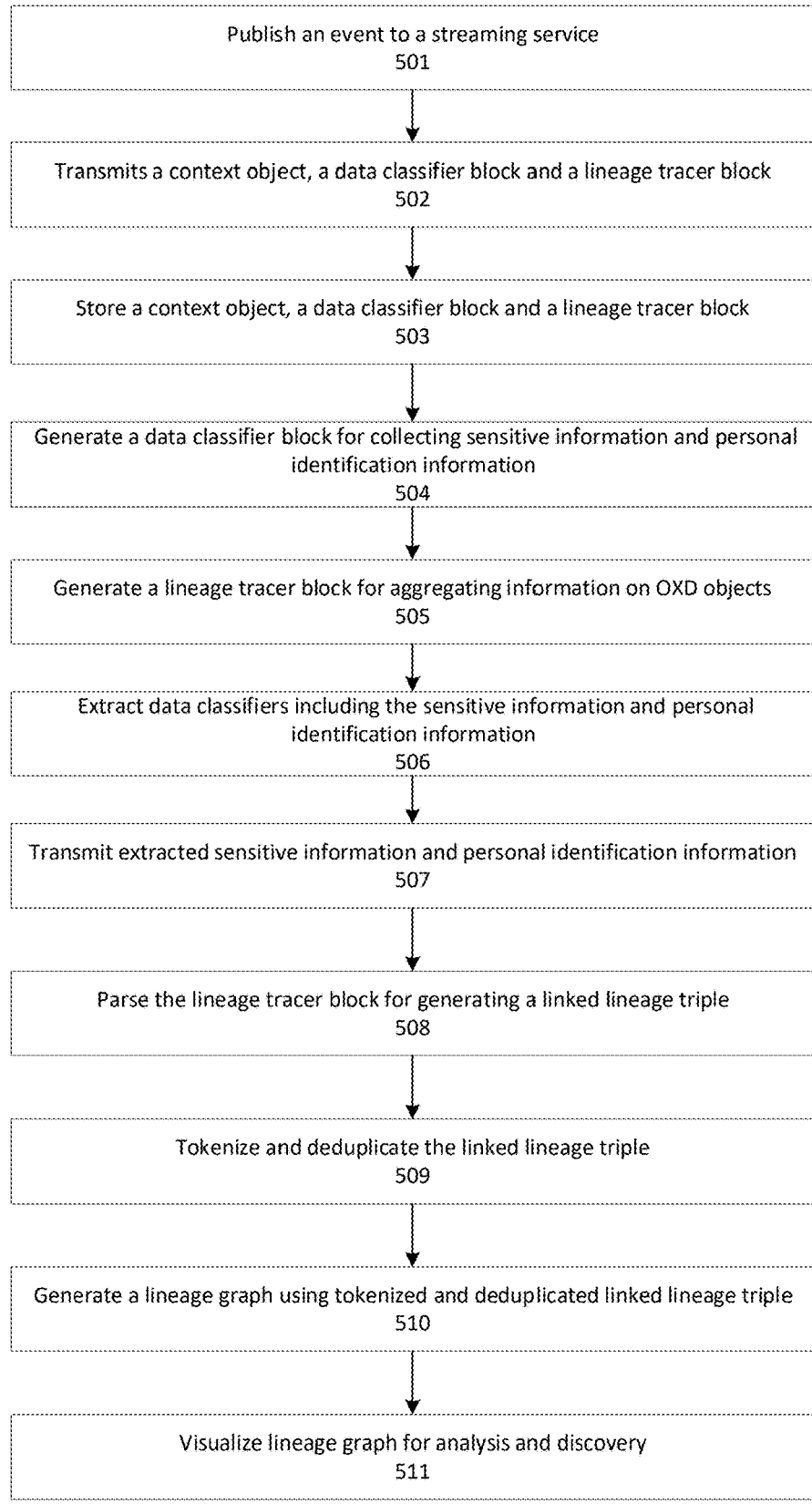
FIG. 5 illustrates a method for generating and providing visualization of a data lineage based on a data snippet in accordance with an exemplary embodiment.

FIG. 5 illustrates a method for generating and providing visualization of a data lineage based on a data snippet in accordance with an exemplary embodiment.

According to exemplary aspects, a method for building an end-to-end data lineage with a limited snippets of a data trace and data classification information is disclosed. More specifically, exemplary aspects of the present disclosure are directed to collecting snippets of data trace and data classification information, which is then processed by the data trace builder system.

In operation 501, a publisher server or device (publisher) publishes a data event to a streaming service. For example, the data event may be an event for Avro schema, which may be a file in JSON format. An Avro record may be a complex data type in Avro, including other fields with their own data types, whether primitive or complex. Although data event in Avro is exemplarily disclosed herein, aspects of the present disclosure are not limited thereto, such that data events in other schemas may be utilized. Further, although the publisher server or device is disclosed herein, aspects of the present disclosure are not limited thereto, such that other systems, servers or devices that are capable of publishing the data event may be utilized. For example, a combined publisher/consumer system, server or device that performs both the operations of the publisher and the consumer may publish the data event.

In operation 502, the publisher transmits or publishes various data objects and/or blocks to a metadata store. The various data objects and/or blocks may include a context object or file, one or more OXD blocks and one or more governance blocks corresponding to the published data event. Each of the OXD blocks may include at least one of an origin block, a transform block and a destination block. According to exemplary aspects, the one or more OXD blocks may collect associated properties that may be utilized for building lineage. The OXD blocks may provide lineage information, which may be localized to the respective data publisher. According to further aspects, the one or more governance blocks may include one or more data classifier blocks, which may be utilized to identify and classify select data elements, such as critical data elements, sensitive data elements, personal identification information and the like. According to exemplary aspects, the operation 502 may be executed contemporaneously with operation 501. However, aspects of the present disclosure are not limited thereto, such that the respective operations may be executed in sequence.

In operation 503, the metadata store may receive and stored the published data objects. According to exemplary aspects, the metadata store may be implemented by a portion of a server or a system of servers.

In operation 504, a data trace builder system or device (data trace builder) generates a data classifier block for collecting select information corresponding to the published data event from the metadata store. According to exemplary aspects, the data classifier block may be utilized to collect the select information, such as the sensitive information and personal identification information. In an example, sensitive information may include information required by compliance regulations, such as California Consumer Privacy Act (CCPA), General Data Protection Regulation (GDPR) and the like. Further, personal identification information may include information that may be utilized to identify a specific person, such as a social security number, driver license number or the like.

In operation 505, the data trace builder may also generate a lineage tracer block for aggregating information on the OXD objects from the metadata store. According to exemplary aspects, the lineage trace block may be a foundational element for gathering information on data lineage. The lineage trace block may include at least one of an origin object, a transform object and a destination object for collecting associative properties.

In operation 506, a data classifier component of the data trace builder extracts data classifiers including select information, such as the sensitive information and personal identification information, from the data classifier block.

In operation 507, the data classifier component of the data trace builder transmits the extracted select information to a lineage processor.

In operation 508, the lineage processor, in receipt of the select information additionally processes the lineage tracer block. More specifically, the lineage processor may crawl and parse the lineage tracer blocks to generate linked lineage triples. According to exemplary aspects, the linked lineage tripes may include two nodes connected by an edge.

In operation 509, data classifiers may be utilized to encrypt or tokenize select information, such as the sensitive information and the personal identification information. According to exemplary aspects, when a consumer consumes data published by a producer, a destination object in an OXD block provided by the producer may become an origin object in the OXD block provided by the consumer. As a result, there may be duplication of data when all of the OXD blocks are read together. Accordingly, such duplications may be removed for more efficient processing by the lineage processor.

In operation 510, a lineage graph or relationship is then generated using the tokenized and deduplicated linked lineage triples. More specifically, the processed lineage triples may be combined together utilizing common nodes. Accordingly, by combining the processed linked lineage triples, an end-to-end lineage graph may be generated.

In operation 511, the generated lineage graph is then visualized for further analysis and discovery of hidden properties and relationships that may not have been apparent prior to the generation and/or visualization of the lineage graph.

Figure 6:
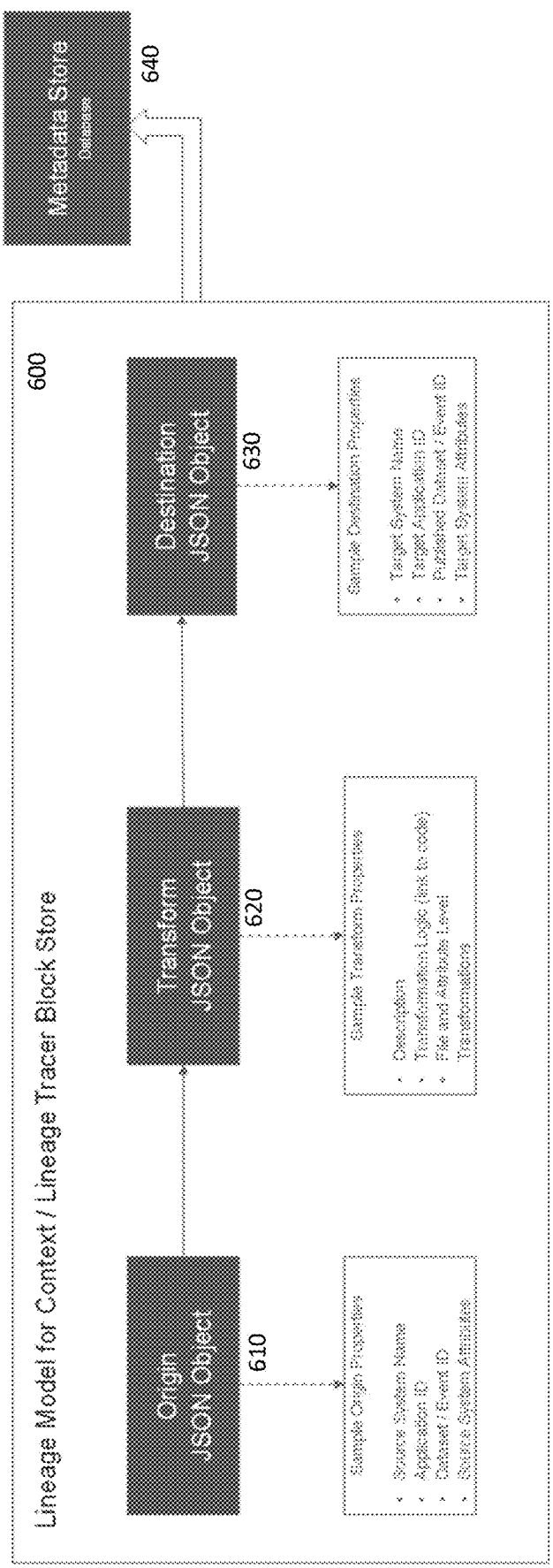
FIG. 6 illustrates a diagram of a lineage model for context stored in a lineage tracer block store in accordance with an exemplary embodiment.

FIG. 6 illustrates a diagram of a lineage model for context stored in a lineage tracer block store in accordance with an exemplary embodiment.

According to exemplary aspects, the lineage model for context/lineage tracer block store (LMFC/LTBS) 600 includes an origin JSON object 610, a transform JSON object 620 and a destination JSON object 630. The LMFC/LTBS 600 may communicate or transmit information or its output to the metadata store database 640. According to exemplary aspects, the LMFC/LTBS 600 may generate the origin JSON object 610, which may be processed to generate the transform JSON object 620, which may be further processed to generate the destination JSON object 630. Upon completion of processing, the LMFC/LTBS 600 may communicate its output to the metadata store database 640. Although data objects are described as JSON objects, aspects of the present disclosure are not limited thereto, such that the data objects may be data objects of differing format.

According to exemplary aspects, the origin JSON object 610 may be a JSON object that captures the properties associated with the data being consumed. The origin JSON object 610 may include properties, such as input source system name, source system application ID, list of column attributes and the like. The origin JSON object 610 may be extended to capture additional properties as necessary.

According to exemplary aspects, the transform JSON object 620 may be a JSON object that captures transformations which are applied on the data being consumed to derive the data being emitted or distributed. The transform JSON object 620 may be designed to capture transformations that exist at an event level and also at the column level. The transform JSON object 620 may include properties, such as description, transformation logic (e.g., link to code), file and attribute level transformations and the like. The JSON object 620 may be extended to capture additional properties as necessary.

According to exemplary aspects, the destination JSON object 630 may be a JSON object that captures the properties associated with the data being emitted or distributed. The destination JSON object 630 may include properties, such as source system name, source system application ID, list of column attributes and the like. The destination JSON object 630 may be extended to capture additional properties as necessary.

According to exemplary aspects, a mode type may include one or more attributes that may be utilized to identify the type of application (e.g., batch or stream) for which lineage attributes are being collected. Further, a mode-subtype attribute may indicate whether the application is a system of record (SOR) or a derived application.

Figure 7:
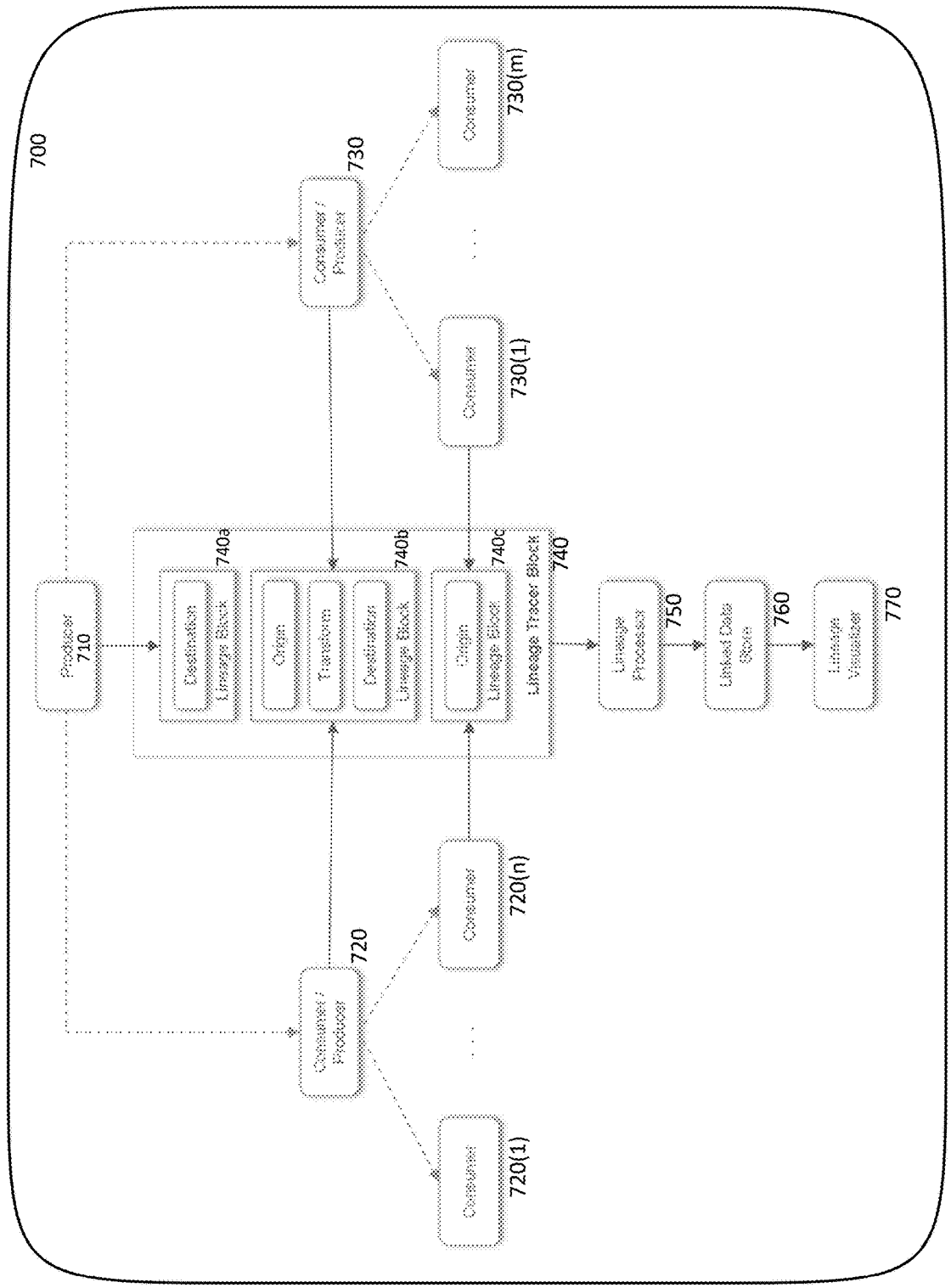
FIG. 7 illustrates a system diagram with differing data system categorizations in accordance with an exemplary embodiment.

FIG. 7 illustrates a system diagram with differing data system categorizations in accordance with an exemplary embodiment.

A SDICT system 700 includes a producer 710, a consumer/producer 720, a consumer/producer 730, multiples of consumers 720(1) up to 720(n), multiples of consumers 730(1) up to 730(m), a lineage tracer block (LTB) 740, a lineage processor 750, a linked data store 760, and a lineage visualizer 770. The LTB 740 includes a lineage block 740a, a lineage block 740b and a lineage block 740c.

According to exemplary aspects, the Origin, Transform and Destination (OXD) JSON objects that form the LTB are loosely coupled and may be included and excluded from the LTB. As exemplarily illustrated in FIG. 7, each of the lineage block 740a, lineage block 740b and lineage block 740c may include different sets of JSON objects. The lineage block 740a includes a destination JSON object only. The lineage block 740b includes each of an origin JSON object, a transform JSON object and a destination JSON object. Lastly, the lineage block 740c includes an origin JSON object only.

According to further aspects, categorization of system that intends to publish the lineage information may determine the inclusion or exclusion of the OXD JSON objects in the LTB. According to further aspects, categorization of a data system or device may include, a producer category, a consumer category and a producer/consumer category.

The producer or data producer category includes the producer 710, and the producer/consumer (or consumer/producer) or data producer/consumer category includes the consumer/producer 720 and consumer/producer 730, which receives data from the producer 710. The consumer/producer 720 and consumer/producer 730 transmits data to the lineage block 740b. The consumer or data consumer category includes consumers 720(1) up to 720(n) that receives data from the consumer/producer 720, and consumers 730(1) up to 730(m) that receives data from the consumer/producer 730, where the values "n" and "m" each represents an integer corresponding to the number of data consumers.

According to exemplary aspects, the producer 710 may be a system or a component that originates data. More specifically, the producer 710 may refer to a system which to not refer to a source, and provide only the destination JSON object from the OXD block to the lineage block 740a. The destination object may store properties associate with an event being transmitted.

According to exemplary aspects, each of the consumer/producer 720 and/or the consumer/producer 730 may refer to a system or a component that consumes data emitted, distributed or broadcasted by a data source. According to further aspects, the consumer/producers 720 and 730 may apply transformation to the consumed data, and then publish new data. The consumer/producers 720 and 730 may provide a complete OXD block to the lineage block 740b. The complete OXD block may include each of the origin JSON object, the transform JSON object and the destination JSON object. In an example, the origin JSON object may capture properties of the data being read. The transform JSON object may capture one or more transformations that were applied on the data being consumed. The destination JSON object may capture properties of the data being originated.

According to exemplary aspects, each of the consumers 720(1) to 720(n) and consumers 730(1) to 730(m) may be a system or a component that consumes data emitted by a data source, but do not originate new data. One or more of the consumers 720(1) to 720(n) and consumers 730(1) to 730(m) may include only the origin JSON block to the lineage block 740c, which may capture properties associated with the event being consumed.

According to exemplary aspects, the lineage processor 750 may aggregate and process one or more LCBs to produce a set of linked lineage triples. According to exemplary aspects, each linked lineage triple may include two nodes connected by an edge or a line.

According to exemplary aspects, the linked data store 760 may store derived lineage triples. According to exemplary aspects, the derived lineage triples may be modernized or converted to represent linked data triples.

According to exemplary aspects, the lineage visualizer 770 may leverage various graph frameworks with various visualization libraries to visually represent an end-to-end lineage and enable data traversal and exploration for the consumers.

Figure 8:
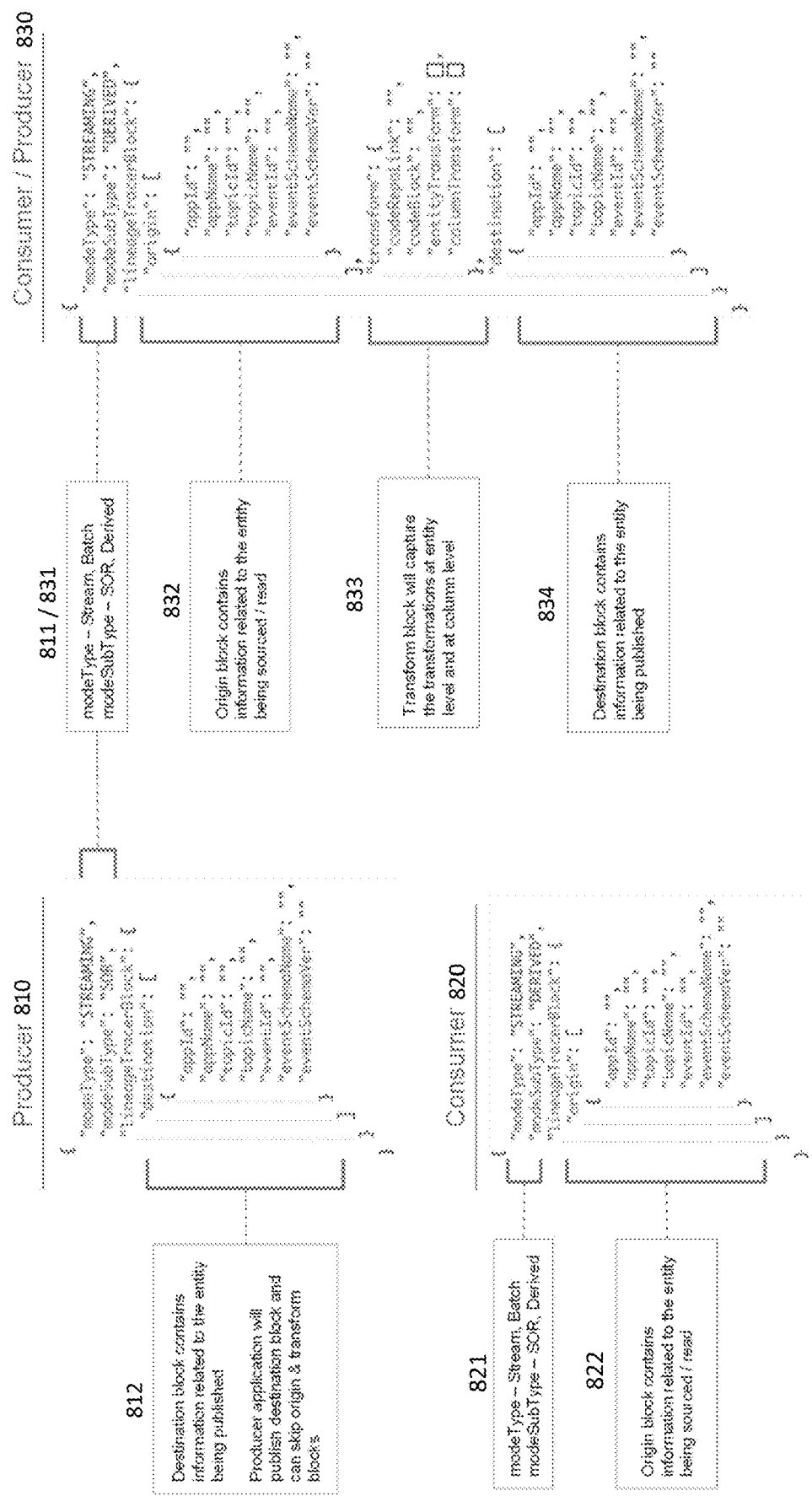
FIG. 8 illustrates exemplary Lineage Trace Block objects in accordance with an exemplary embodiment.

FIG. 8 illustrates exemplary Lineage Trace Block objects in accordance with an exemplary embodiment.

More specifically, FIG. 8 illustrates a producer JSON object 810 produced by a data producer system or component, a consumer JSON object 820 produced by a data consumer system or component, and a consumer/producer JSON object 830 produced by a data consumer/producer system or component. Each of the JSON objects may include a header block, and one or more of an origin block, a transform block and a destination block. The header block may specify a mode type (e.g., Stream or Batch) and a mode subtype (e.g., SOR or Derived).

An exemplary producer JSON object 810 produced by the producer may include a header block 811 and a destination block 812. However, the producer JSON object 810 may be void of an origin block and a transform block. The header block 811 may specify a mode type of STREAMING and mode subtype of SOR for the producer JSON object 810. The destination block 812 may contain information related to an entity being published. According to exemplary aspects, the producer JSON object 810 may publish the destination block 812, and is able to skip the origin block and the transform block.

An exemplary consumer JSON object 820 produced by the consumer may include and origin block 822 proceeded by a header block 821. However, the consumer JSON object 820 may be void of a transform block and a destination block. The header block 821 may specify a mode type of STREAMING and a mode subtype of DERIVED for the consumer JSON object 820. The origin block 822 may contain information related to an entity being sourced or read.

An exemplary consumer/producer JSON object 830 produced by the data consumer/producer system or component may include a header block 831, an origin block 832, a transform block 833 and a destination block 834. The header block 831 may specify a mode type of STERAMING and a mode subtype of DERIVED for the consumer/producer JSON object 830. The origin block 832 may contain information related to an entity being sourced or read. The transform block 833 may capture one or more transformations at entity level and at column level. The destination block 834 may contain information related to the entity being published.

FIGS. 9A-9D illustrate a Lineage Tracer Block (LTB) design and corresponding JSON objects in accordance with an exemplary embodiment.

Figure 9A:
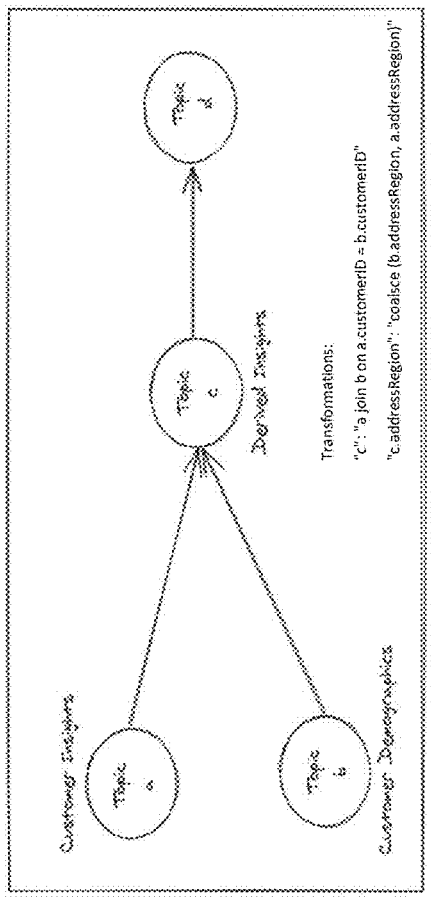
FIGS. 9A-9D illustrate a Lineage Tracer Block design and corresponding JSON objects in accordance with an exemplary embodiment.

As illustrated in FIG. 9A, Topic a (Customer Insights) joins with Topic b (Customer Demographics) on customer ID key derive Topic c (Derived Insights). Moreover, according to exemplary aspects, an attribute transformation where addressRegion undergoes a coalesce operation may exist.

Figure 9C:
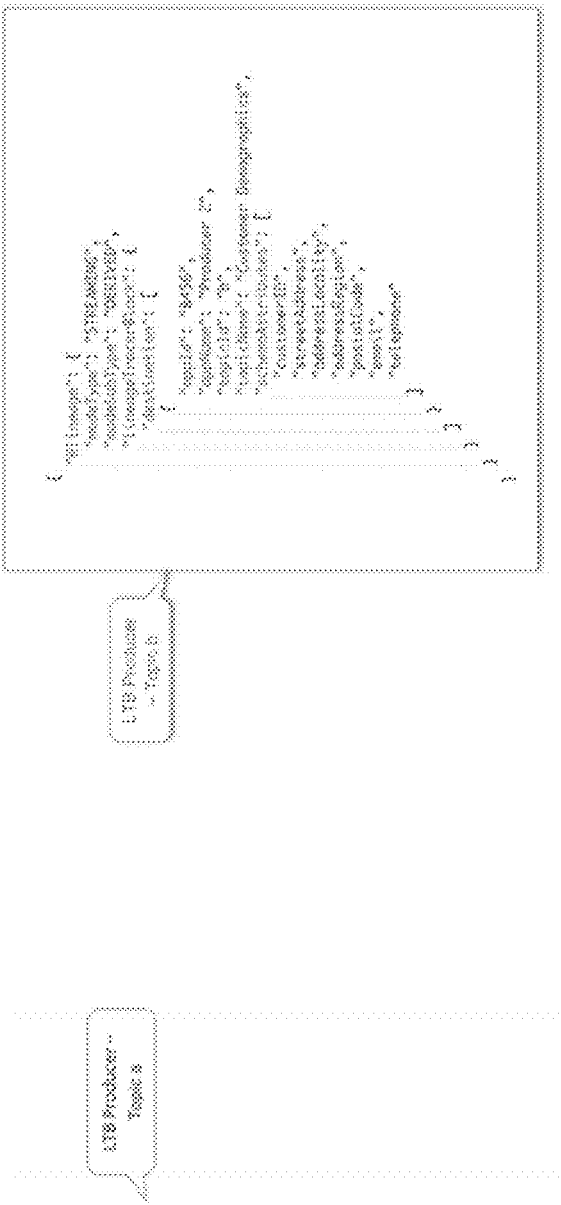
Figure 9B:
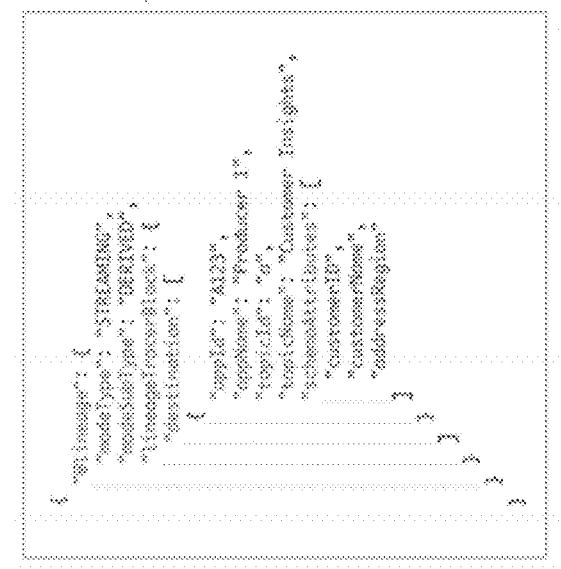

More specifically, as can be seen from FIG. 9A, Topic a and Topic b are producers of data, whereas Topic c is a producer/consumer. Here, in the above noted example, Topic a and Topic b, both being producers, produces only the destination JSON object from the OXD blocks, as can be seen in FIGS. 9B and 9C.

Figure 9D:
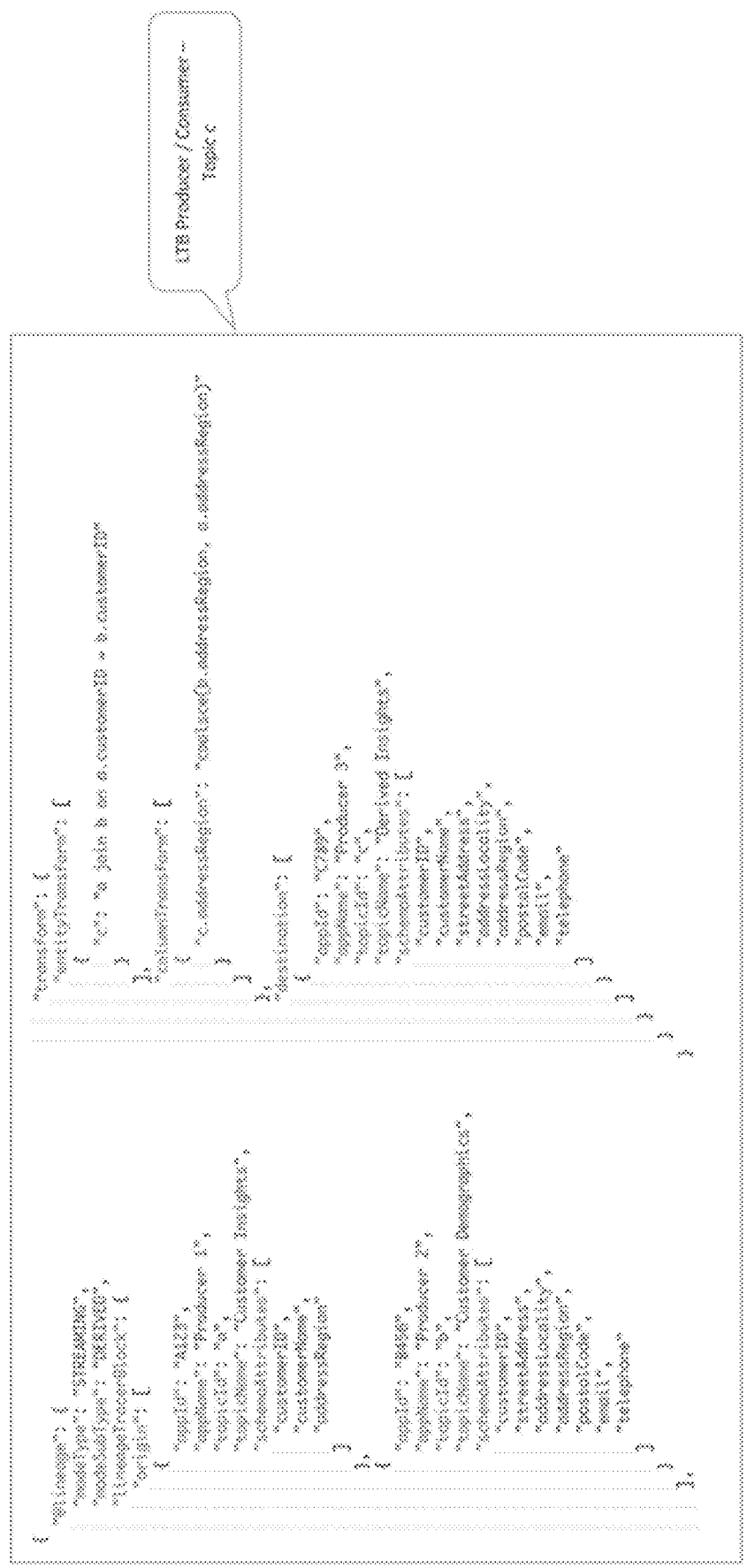

Topic c, being a producer/consumer, produces the complete OXD block including an origin JSON object, a transform JSON object and a destination JSON object as can be seen in FIG. 9D. As exemplarily illustrated in FIG. 9D, the origin JSON object stores information about the consumed topics, namely Topic a and Topic b. Further, the transform JSON object stores one or more transformations applied on the source topics. Lastly, the destination JSON object stores the information about the topic being produced, namely Topic c.

FIG. 10 illustrates a Governance Classifier Block in accordance with an exemplary embodiment.

According to exemplary aspects, the context may be extended to include classifications required for Infosec, Privacy and Governance. Data classifiers may be collected from the publishers, which contain Sensitive Data Element (SDE) and Personal Identification Information (PII). The SDE and PII may be combined with the LTB to show the Provenance and Lineage of data with critical tags, such as PII/SDE, which may be required by GDPR/CPRA/KYC mandates. Moreover, detection of PII in the context registration may be used to proactively initialize tokenization/encryption service as needed and send alerts to Governance/InfoSec or other stakeholders.

Figure 11:
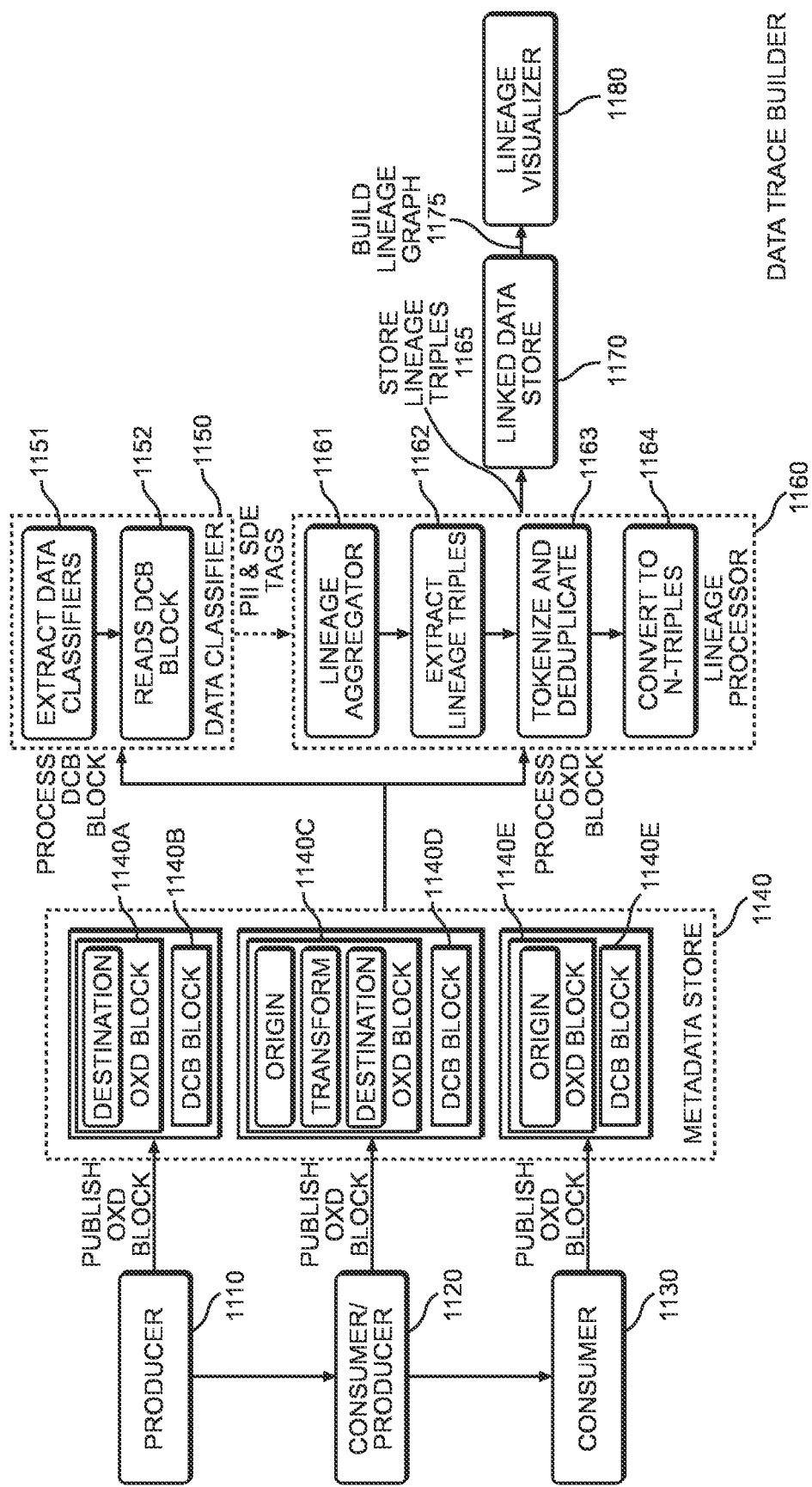
FIG. 11 illustrates a Data Trace Builder system diagram in accordance with an exemplary embodiment.

FIG. 11 illustrates a Data Trace Builder (DTB) system diagram in accordance with an exemplary embodiment.

As illustrated in FIG. 11, the DTB system includes a producer 1110, a consumer/producer 1120, a consumer 1130, a metadata store 1140, a data classifier 1150, a lineage processor 1160, a linked data store 1170 and a lineage visualizer 1180.

According to exemplary aspects, each of the producer 1110, the consumer/producer 1120 and the consumer 1130 publishes its respective OXD blocks to a metadata store 1140. The producer 1110 published OXD block 1140*a* for storage with a corresponding DCB block 1140*b* in the metadata store 1140. The consumer/producer 1120 publishes OXD block 1140*c* for storage with a corresponding DCB block 1140*d* in the metadata store 1140. The consumer 1130 publishes OXD block 1140*e* for storage with a corresponding DCB block 1140*f* in the metadata store 1140. The OXD block 1140*a* includes a destination JSON object. The OXD block 1140*c* includes each of an origin JSON object, a transform JSON object, and a destination JJSON object. The OXD block 1140*e* includes an origin JSON object.

The metadata store 1140 transmits the stored DCB block 1140*b*, DCB block 1140*d* and DCB block 1140*f* to the data classifier 1150 for processing. The data classifier 1150 reads the received DCB blocks in operation 1151, and extracts data classifiers (e.g., PII and SDE tags) therein in operation 1152. The data classifier 1150 then sends the extracted data classifiers to the lineage processor 1160.

The metadata store 1140 transmits the stored OXD block 1140*a*, OXD block 1140*c* and OXD block 1140*e* to the lineage processor 1160 for processing. The lineage processor 1160 aggregates lineage via a lineage aggregator in operation 1161, extracts out lineage triples from the aggregated lineage in operation 1162, tokenize and deduplicate the extracted lineage triples in operation 1163, and converts the tokenized and deduplicated linage triples into N-triples in operation 1164.

The lineage processor 1160 transmits the converted lineage triples to the linked data store 1170 for storage. The lineage visualize 1180 obtains the lineage triples and builds a linage graph.

According to exemplary aspects, the data trace builder (DTB) may read context or context data from the metadata store 1140 to build a lineage graph for visualizing an end-to-end lineage. Context may refer to a JSON file including a context object (e.g., @context), lineage tracer block object (e.g., @lineage) and data classifier block object (e.g., @dataclassifier). According to further aspects, data classifier and lineage processor may form crucial components of the data trace builder which processes the context JSON file to produce lineage triples, which may then be used to build a lineage graph for visualizing the end-to-end lineage.

According to exemplary aspects, the data trace builder processes the context data or file by sequentially executing the following operations: (i) extracting data classification, (ii) generating lineage triples, (iii) building lineage graph, and (iv) visualizing end-to-end lineage.

The extracting data classification includes two sub-operations, namely, reading of data classifier block (operation 1151), and extracting data classifiers (operation 1152).

For the reading of the data classifier block in operation 1151, each of the publishers and consumers provides a context JSON file or data and is stored in a context store, a document database. Data classifier 1150, a component of the data trace builder, may connect to the context store to read all available context JSON files. The data classifier 1150 may read and collect data classifier blocks from each of the context JSON files.

For the extracting of the data classifiers in operation 1152, the extracted data classifier blocks (DCBs) are read to gather personal identification information (PII) and sensitive data elements (SDE). These PII and SDE attributes are grouped together after deduplication and classification tags are assigned to each group.

The generating lineage triples includes four sub-operations, namely, reading of lineage tracer block (LTB), aggregating lineage tracer blocks (operation 1161), tokenizing and deduplicating lineage triples (operation 1163), and storing lineage triples in lineage data store (operation 1165).

For the reading of the lineage tracer block, each of the publishers and consumers provides context JSON data, which is then stored in a context store, a document database. Lineage processor 1150, which is a component of data tracer builder, connects to the context store or the metadata store 1140 to read all available context JSON files. A component of the lineage processor 1150 reads and collects lineage tracer blocks from each context JSON file.

For the aggregating of the lineage tracer blocks in operation 1170, lineage tracer block, which is a JSON object including one or more of an origin JSON object, a transform JSON object and a destination JSON object. Each lineage tracer block may undergo iterations to stitch together the collected information and convert to a node-edge-node structure. According to exemplary aspects, such node-edge-node structure may be referred to as a lineage triplet.

For the tokenizing and deduplicating lineage triples in operation 1163, when a consumer consumes data emitted or broadcasted by a producer, a destination JSON object in an OXD block provided by the producer becomes an origin JSON object in the OXD block provided by the consumer. Accordingly, there may be duplication of data when all of the OXD blocks are read together. In view of the above, the linage triples generated above are tokenized and deduplicated.

For the storing lineage triples in lineage data store in operation 1165, the derived lineage triples are first modernized or converted to represent linked data triples in operation 1164. These modernized linked data lineage triples are then stored in the linked data store 1170.

For the building of the lineage graph in operation 1175, a lineage triple defines a relationship between two nodes along with an associative property connecting these nodes. According to exemplary aspects, the derived set of lineage triples may be collectively iterated over to convert the triples into a labeled property graph or may be modernized and combined together to represent a knowledge graph that computers can interpret and reason about. Based on the application requirements, the processed lineage triples may be stored in the knowledge graph store or a property graph store.

Figure 12:
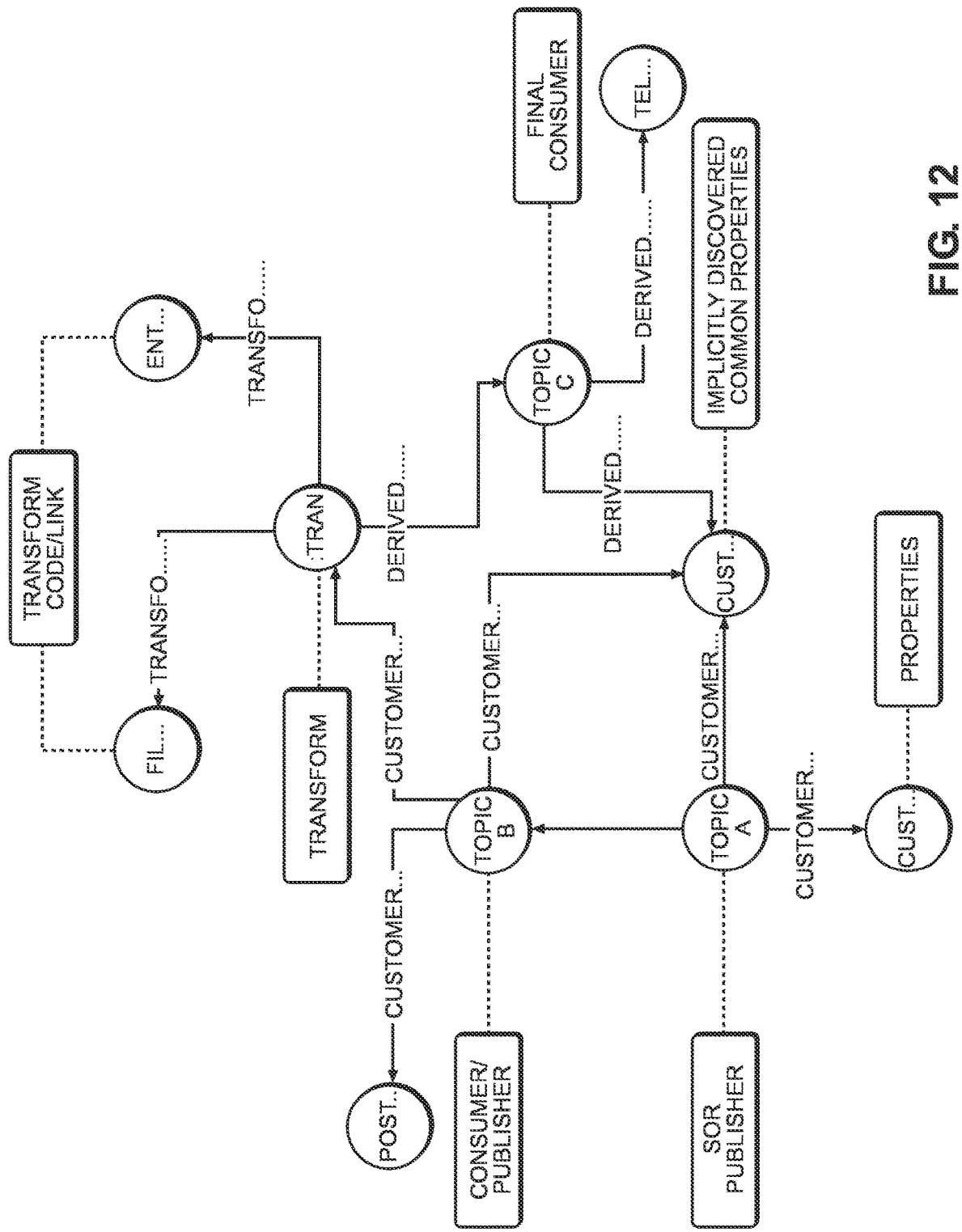
FIG. 12 illustrates a structure of the knowledge graph, which allows for discovery of implicit properties between multiple publishers and consumers due to automated triple associations, in accordance with an exemplary embodiment.

Moreover, as exemplarily illustrated in the knowledge graph of FIG. 12, a structure of the knowledge graph allows for discovery of implicit properties between multiple publishers and consumers due to automated triple associations. For example, based on the communications between the various entities (including the SOR publisher, the consumer/publisher and the final consumer) one or more transformations performed, and one or more properties of the respective entities may be determined. Moreover, one or more implicitly discovered common properties between the various entities may additionally be uncovered or determined Accordingly, the built knowledge graph, upon its generation, may allow for additional data processing, which were unable to be performed previously. The additional data processing may include, without limitation, one or more of data crawling, graph mining and graph machine learning (GML).

According to exemplary aspects, GML may refer to an application of machine learning to graphs specifically or predictive and prescriptive tasks. GML tasks may include supervised GML tasks and unsupervised GML tasks. Supervised GML tasks includes prediction of node properties, as well as link prediction between various nodes, graph property prediction and the like. Unsupervised GML tasks includes representation learning, clustering or community detection, similarity detection between nodes, centrally and pathfinding, and the like.

For the visualization of end-to-end lineage in operation 1175, one or more graph frameworks may be leveraged along with various visualization libraries to represent an end-to-end lineage and enable data traversal and exploration for the consumers.

Figure 13:
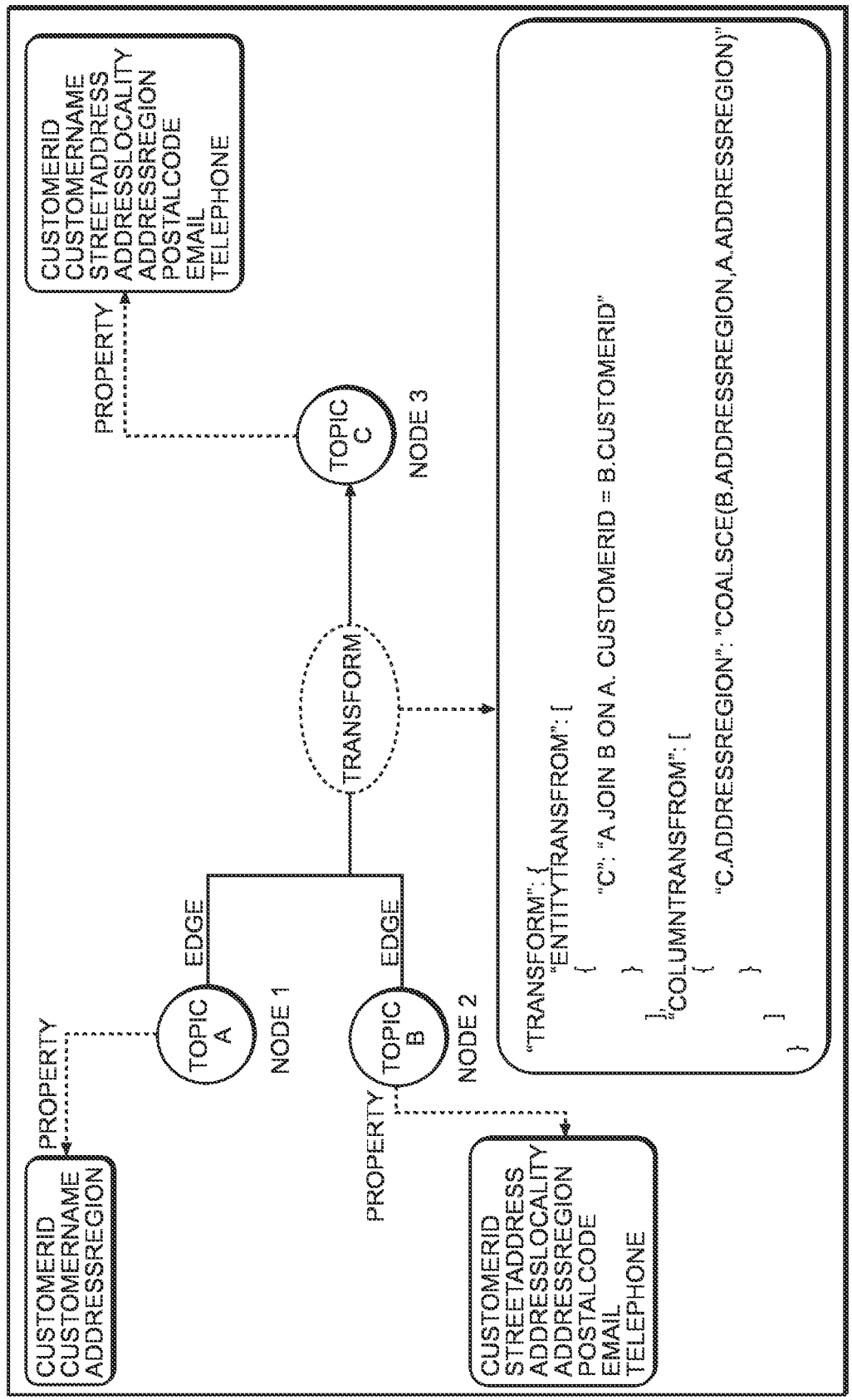
FIG. 13 illustrates a property graph model for performing a conceptual lineage tracking in accordance with an exemplary embodiment.

Subsequent to the visualization of the end-to-end lineage in operation 1175, a conceptual lineage tracking may be performed using a property graph model as exemplarily illustrated in FIG. 13. As illustrated in FIG. 13, transformative properties may be determined based on the communications between Topic a (Node 1), Topic b (Node 2) and Topic c (Node 3), and respective properties of each of the nodes or topics. More specifically, based on the properties of Topic a (Node 1) (including customerID, customerName, and addressRegion), properties of Topic b (Node 2) (including customer ID, streetaddress, addressLocalitiy, addressRegion, postalCode, Email and telephone), and the properties of Topi c (Node) (including customer ID, customerName, streetAddress, addressLocality, addressRegion, postalCode, Email, and telephone), one or more transformations performed, whether performed offline or in a differing environment or platform, may be determined. For example, the one or more transformations conducted may include entity level transformation (e.g., "c": "a join b on a customerID=b.customerID") and column transformation (e.g., "c.addressRegion":"coalesce (b.addressRegion, a.addressRegion)").

Current solutions for performance of lineage tracing only support a limited set of capabilities have a number of shortcomings. For example, current solutions available have dependencies on using a vendor locked-in implementation of open source Apache Kafka. Moreover, currently solutions may be able to only capture data transformation using vendor proprietary SQL implementations. Current solutions are also unable to capture transformations performed outside of the streaming pipeline. For example, transformations performed offline or using a different tool or technology platform. Further, to the above, current solutions are unable to be effectively scaled, as they are limited to a small number of schemas (e.g., 2000 schemas). Current solutions may also lack capability to present data lineage and classification in an interactive knowledge or property graph visualization.

In contrast to the conventional solutions available, the presently disclosed system and method allows to operation without vendor dependencies. More specifically, at least since the present solution is designed as an atomic building block, all publishers, consumers and transformers using any version of Kafka, such that any vendor supported or open source Apache Kafka or the like may implement it. Moreover, the present solution may expand scope and capability by capturing transformations performed anywhere, either within the streaming pipeline or offline. The transformations performed may be captured using polyglot technologies, programming languages or even third-party transformation solutions. Moreover, the system may be scaled to any degree without limitation as information may be collected at each step and the system may be built using the collected information using the lineage builder engine.

Further to the above, since the lineage is built using graph processing at its core in the present disclosure, the lineage may be visualized using property graph or semantic graph model. Further, the lineage built according to exemplary embodiments of the present disclosure may provide enhanced features, such as graphical machine readable data discovery, crawling, graph data mining, graph machine learning, semantic search and has applications in generative artificial intelligence technologies.

Moreover, data security and privacy may be effectuated by the present solution through its system implemented governance. Governance classifiers from the data classifier block may be used to identify and classify critical data elements as well as sensitive data elements, which may be required by certain government regulations, and may be critical in ensuring data intelligence, data security and privacy.

According to exemplary aspects, sensitive data and detecting using the data classifier block may be used to proactively encrypt or tokenize sensitive data elements and initialize an encrypted streaming pipeline using latest ciphers there by ensuring the security of the data streams.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for tracing data streamed across differing different system platforms, the method comprising:
   providing, by each of a plurality of devices and to a database, context data corresponding to a data event published to a streaming service including a streaming pipeline;
   storing, in the database, the context data provided by each of the plurality of devices;

reading, by a data classifier, the context data stored in the database and extracting a data classifier block from the stored context data;
gathering, by the data classifier and from the extracted data classifier block, personal identification information and sensitive data elements;
reading, by a lineage processor, the context data stored in the database and extracting a lineage tracer block from the stored context data;
converting, by the lineage processor, the lineage tracer block into a linked lineage triple;
processing, by a lineage processor, the linked lineage triple by tokenizing and deduplicating the linked lineage triple; and
generating, by the data trace builder, a lineage graph using the tokenized and deduplicated linked lineage triple for visualization.

2. The method according to claim 1, wherein the lineage tracer block includes one or more of an origin data object, a transform data object and a destination data object.

3. The method according to claim 2, wherein the origin data object includes information related to an entity being sourced.

4. The method according to claim 2, wherein the destination data object includes information related to the data event being published.

5. The method according to claim 2, wherein the transform data object includes one or more transformations that occurred.

6. The method according to claim 5, wherein at least one of the one or more transformations is performed offline from the streaming pipeline.

7. The method according to claim 5, wherein the one or more transformations include a transformation at an entity level or a transformation at a column level.

8. The method according to claim 1, wherein the plurality of devices includes a data publisher device that is configured as a dedicated data publisher.

9. The method according to claim 1, wherein the plurality of devices includes a data publisher device that is configured to jointly operate as a data publisher and a data consumer.

10. The method according to claim 1, wherein the plurality of devices includes a data consumer device that is configured as a dedicated data consumer.

11. The method according to claim 1, wherein the lineage tracer block includes a mode type.

12. The method according to claim 11, wherein the mode type includes one of a streaming type and a batch type.

13. The method according to claim 11, wherein the lineage tracer block further includes a mode sub-type.

14. The method according to claim 13, wherein the mode sub-type includes one of a system of record and derived.

15. The method according to claim 1, wherein the linked lineage triple includes at least two nodes and an edge that connects the at least two nodes.

16. The method according to claim 1, further comprising:
deriving at least one insight specific to a node by applying a graphic machine learning algorithm on the lineage graph.

17. The method according to claim 1, wherein the lineage tracer block is a JSON object qualified with prove ontology.

18. The method according to claim 5, wherein at least one the one or more transformations is determined based on property attributes on nodes present in the lineage graph.

19. A system for tracing data streamed across differing different system platforms, the system comprising:
a memory; and
a processor,
wherein the system is configured to perform:
providing, by each of a plurality of devices and to a database, context data corresponding to a data event published to a streaming service including a streaming pipeline;
storing, in the database, the context data provided by each of the plurality of devices;
reading, by a data classifier, the context data stored in the database and extracting a data classifier block from the stored context data;
gathering, by the data classifier and from the extracted data classifier block, personal identification information and sensitive data elements;
reading, by a lineage processor, the context data stored in the database and extracting a lineage tracer block from the stored context data;
converting, by the lineage processor, the lineage tracer block into a linked lineage triple;
processing, by the lineage processor, the linked lineage triple by tokenizing and deduplicating the linked lineage triple; and
generating, by a data trace builder, a lineage graph using the tokenized and deduplicated linked lineage triple for visualization.

20. A non-transitory computer readable storage medium that stores a computer program for tracing data streamed across differing different system platforms, the computer program, when executed by a processor, causing a system to perform a plurality of processes comprising:
providing, by each of a plurality of devices and to a database, context data corresponding to a data event published to a streaming service including a streaming pipeline;
storing, in the database, the context data provided by each of the plurality of devices;
reading, by a data classifier, the context data stored in the database and extracting a data classifier block from the stored context data;
gathering, by the data classifier and from the extracted data classifier block, personal identification information and sensitive data elements;
reading, by a lineage processor, the context data stored in the database and extracting a lineage tracer block from the stored context data;
converting, by the lineage processor, the lineage tracer block into a linked lineage triple;
processing, by the lineage processor, the linked lineage triple by tokenizing and deduplicating the linked lineage triple; and
generating, by a data trace builder, a lineage graph using the tokenized and deduplicated linked lineage triple for visualization.

* * * * *